(12) United States Patent
Kim et al.

(10) Patent No.: US 9,622,202 B2
(45) Date of Patent: Apr. 11, 2017

(54) METHOD AND APPARATUS FOR GENERATING SYNCHRONOUS SIGNAL IN WIRELESS ACCESS SYSTEM FOR SUPPORTING SUPER-HIGH FREQUENCY BAND

(71) Applicant: LG ELECTRONICS INC., Seoul (KR)

(72) Inventors: Jinmin Kim, Anyang-si (KR); Kitae Kim, Anyang-si (KR); Hyunsoo Ko, Anyang-si (KR); Jaehoon Chung, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 43 days.

(21) Appl. No.: 14/440,564

(22) PCT Filed: Nov. 5, 2013

(86) PCT No.: PCT/KR2013/009936
§ 371 (c)(1),
(2) Date: May 4, 2015

(87) PCT Pub. No.: WO2014/069967
PCT Pub. Date: May 8, 2014

(65) Prior Publication Data
US 2015/0289220 A1  Oct. 8, 2015

Related U.S. Application Data

(60) Provisional application No. 61/722,728, filed on Nov. 5, 2012.

(51) Int. Cl.
*H04W 56/00* (2009.01)
*H04L 27/26* (2006.01)
*H04W 72/04* (2009.01)

(52) U.S. Cl.
CPC ..... *H04W 56/0015* (2013.01); *H04L 27/2613* (2013.01); *H04L 27/2657* (2013.01);
(Continued)

(58) Field of Classification Search
None
See application file for complete search history.

(56) References Cited

U.S. PATENT DOCUMENTS

2007/0147336 A1  6/2007  Lee et al.
2011/0002430 A1  1/2011  Kim et al.
(Continued)

FOREIGN PATENT DOCUMENTS

JP  2006-287800 A  10/2006
JP  2007-520931 A   7/2007
(Continued)

*Primary Examiner* — Kouroush Mohebbi
(74) *Attorney, Agent, or Firm* — Birch, Stewart, Kolasch & Birch, LLP

(57) ABSTRACT

The present invention relates to a method for newly defining a synchronous signal used in a super-high frequency band and acquiring downlink synchronization by using the synchronous signal, and an apparatus for supporting the same. The method for enabling a base station to transmit the synchronous signal in the wireless access system supporting the super-high frequency band, as one embodiment of the present invention, comprises the steps of: generating a general synchronous signal which do not have repetitive characteristics; generating a repetitive synchronous signal on the basis of a repetition factor for estimating a carrier frequency offset of the super-high frequency band; transmitting the general synchronous signal from a first frame; and transmitting the repetitive synchronous signal from a second frame. At this time, the repetition factor indicates the repetitive characteristic of the repetitive synchronous signal.

8 Claims, 11 Drawing Sheets

(52) U.S. Cl.
CPC ...... *H04L 27/2675* (2013.01); *H04L 27/2692* (2013.01); *H04W 56/00* (2013.01); *H04W 56/009* (2013.01); *H04W 72/042* (2013.01)

(56) References Cited

U.S. PATENT DOCUMENTS

| | | | |
|---|---|---|---|
| 2011/0026648 A1* | 2/2011 | Swarts | H04J 11/0086 375/343 |
| 2011/0256868 A1 | 10/2011 | Nogami et al. | |
| 2014/0050206 A1 | 2/2014 | Seo et al. | |

FOREIGN PATENT DOCUMENTS

| | | |
|---|---|---|
| JP | 2012-199948 A | 10/2012 |
| KR | 10-2008-0042421 A | 5/2008 |
| KR | 10-2010-0023720 A | 3/2010 |
| KR | 10-2011-0029180 A | 3/2011 |
| WO | WO 2010/073468 A1 | 7/2010 |
| WO | WO 2010/140825 A2 | 12/2010 |
| WO | WO 2012/148236 A2 | 11/2012 |

* cited by examiner

| | No Zero inserted preamble |
| | 1 Zero inserted preamble |
| | 2 Zero inserted preamble |
| | 3 Zero inserted preamble |

//<br>
METHOD AND APPARATUS FOR GENERATING SYNCHRONOUS SIGNAL IN WIRELESS ACCESS SYSTEM FOR SUPPORTING SUPER-HIGH FREQUENCY BAND

CROSS REFERENCE TO RELATED APPLICATIONS

This application is the National Phase of PCT International Application No. PCT/KR2013/009936, filed on Nov. 5, 2013, which claims priority under 35 U.S.C. 119(e) to U.S. Provisional Application No. 61/722,728, filed on Nov. 5, 2012, all of which are hereby expressly incorporated by reference into the present application.

TECHNICAL FIELD

The present invention relates to definition of a new synchronization signal for use in a super-high frequency band, a method for acquiring downlink synchronization using the synchronization signal, and an apparatus supporting the same in a wireless access system.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

Compared to legacy wireless access systems, a super-high frequency wireless access system operates with a center frequency of a few GHz to tens of GHz. The super-high frequency characteristics of the center frequency worsen the Doppler effect generated during movement of a User Equipment (UE) or the effects of a Carrier Frequency Offset (CFO) caused by an oscillator error between a UE and a Base Station (BS). For example, the Doppler effect and the CFO increase linearly with respect to the center frequency. The CFO resulting from the oscillator error between the UE and the BS has a large value in units of ppm ($=10^{-6}$)

To overcome the CFO problem encountered with detection of a synchronization signal in a legacy cellular network, a BS transmits a Synchronization Channel (SCH), a pilot signal, and/or a Reference Symbol (RS) to a UE and the UE estimates and/or corrects a CFO using the received signal. However, the super-high frequency wireless access system generates a much larger CFO value than the legacy cellular network. Accordingly, there is a need for defining a synchronization signal/channel in a super-high frequency band and transmitting the synchronization signal/channel in a different manner from in a legacy network, in order to estimate/correct a CFO.

DISCLOSURE

Technical Problem

An object of the present invention devised to solve the problem lies on defining a new synchronization signal for use in a super-high frequency band.

Another object of the present invention is to provide various methods for transmitting a synchronization signal to acquire a synchronization channel in a super-high frequency band.

Another object of the present invention is to provide apparatuses supporting the above-described methods.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

The present invention relates to a method for defining a new synchronization signal for use in a super-high frequency and acquiring downlink synchronization using the synchronization signal, and an apparatus supporting the same.

In an aspect of the present invention, provided herein is a method for transmitting a synchronization signal by a Base Station (BS) in a wireless access system supporting a super-high frequency band. The method includes generating a general synchronization signal without a repetitive characteristic, generating a repetitive synchronization signal based on a repetition factor used for estimating a Carrier Frequency Offset (CFO) of the super-high frequency band, transmitting the general synchronization signal in a first frame, and transmitting the repetitive synchronization signal in a second frame. The repetition factor represents a repetitive characteristic of the repetitive synchronization signal.

The method may further comprise transmitting a message including a repetitive sequence bitmap indicating a position at which the repetitive synchronization signal is transmitted and the repetition factor. The repetitive sequence bitmap may indicate positions of the first and second frames.

In another aspect of the present invention, provided herein is a method for receiving a synchronization signal by a User Equipment (UE) in a wireless access system supporting a super-high frequency band. The method includes receiving a general synchronization signal without a repetitive characteristic in a first frame, receiving a repetitive synchronization signal transmitted for estimating a CFO of the super-high frequency band, in a second frame, and estimating the CFO of the super-high frequency band using the general synchronization signal and the repetitive synchronization signal.

The method may further comprise receiving a message including a repetitive sequence bitmap indicating a position at which the repetitive synchronization signal is transmitted and a repetition factor. The repetitive sequence bitmap may indicate positions of the first and second frames.

In another aspect of the present invention, provided herein is a BS for transmitting a synchronization signal in a wireless access system supporting a super-high frequency band. The BS includes a transmitter, and a processor configured to generate the synchronization signal. The processor is configured to generate a general synchronization signal without a repetitive characteristic, to generate a repetitive synchronization signal based on a repetition factor used for estimating a CFO of the super-high frequency band, to transmit the general synchronization signal in a first frame through the transmitter, and to transmit the repetitive synchronization signal in a second frame through the transmitter. The repetition factor represents a repetitive characteristic of the repetitive synchronization signal.

The processor may control the transmitter to transmit a message including a repetitive sequence bitmap indicating a position at which the repetitive synchronization signal is transmitted and the repetition factor. The repetitive sequence bitmap may indicate positions of the first and second frames.

In another aspect of the present invention, provided herein is a UE for receiving a synchronization signal in a wireless access system supporting a super-high frequency band. The UE includes a receiver, and a processor configured to estimate a CFO of the super-high frequency band. The processor is configured to receive a general synchronization signal without a repetitive characteristic in a first frame through the receiver, to receive a repetitive synchronization signal transmitted for estimating the CFO of the super-high frequency band in a second frame through the receiver, and to estimate the CFO of the super-high frequency band using the general synchronization signal and the repetitive synchronization signal.

The processor may control the receiver to receive a message including a repetitive sequence bitmap indicating a position at which the repetitive synchronization signal is transmitted and a repetition factor. The repetitive sequence bitmap may indicate positions of the first and second frames.

According to the above aspects of the present invention, the repetitive synchronization signal may be configured by repeating a sequence included in the repetitive synchronization signal as many times as a repetition factor.

The afore-described aspects of the present invention are merely a part of preferred embodiments of the present invention. Those skilled in the art will derive and understand various embodiments reflecting the technical features of the present invention from the following detailed description of the present invention.

Advantageous Effects

According to the embodiments of the present invention, the following effects can be achieved.

First, since the embodiments of the present invention provide a synchronization signal used in a super-high frequency band, the synchronization signal can be accurately detected and corrected even in the super-high frequency band seriously affected by the Doppler effect.

Secondly, a Carrier Frequency Offset (CFO) value can be corrected appropriately by various methods for transmitting a synchronization signal to acquire a synchronization channel in a super-high frequency band.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention. In the drawings.

BEST MODE

Figure 1:
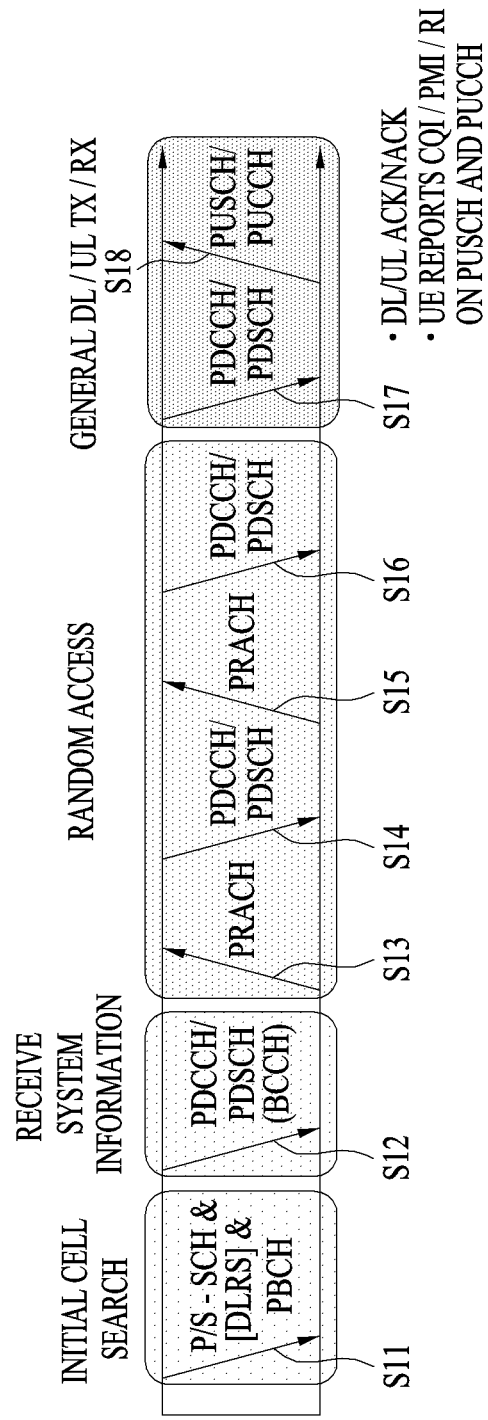
FIG. 1 illustrates physical channels and a general signal transmission method using the physical channels, which may be used in embodiments of the present invention.

Embodiments of the present invention described below in detail relate to definition of a new synchronization signal for use in a super-high frequency band, methods for acquiring DownLink (DL) synchronization using the synchronization signal, and apparatuses supporting the same.

The embodiments of the present invention described below are combinations of elements and features of the present invention in specific forms. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or elements of any one embodiment may be included in another embodiment and may be replaced with corresponding constructions or features of another embodiment.

In the description of the attached drawings, a detailed description of known procedures or steps of the present invention will be avoided lest it should obscure the subject matter of the present invention. In addition, procedures or steps that could be understood to those skilled in the art will not be described either.

In the embodiments of the present invention, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present invention, the term terminal may be replaced with a UE, a Mobile Station (MS), a Subscriber Station (SS), a Mobile Subscriber Station (MSS), a mobile terminal, an Advanced Mobile Station (AMS), etc.

A transmitter is a fixed and/or mobile node that provides a data service or a voice service and a receiver is a fixed and/or mobile node that receives a data service or a voice service. Therefore, a UE may serve as a transmitter and a BS may serve as a receiver, on an UpLink (UL). Likewise, the UE may serve as a receiver and the BS may serve as a transmitter, on a DL.

The embodiments of the present invention may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, and a 3GPP2 system. In particular, the embodiments of the present invention may be supported by the standard specifications, 3GPP TS 36.211, 3GPP TS 36.212, 3GPP TS 36.213, and 3GPP TS 36.321. That is, the steps or parts, which are not described to clearly reveal the technical idea of the present invention, in the embodiments of the present invention may be explained by the above standard specifications. All terms used in the embodiments of the present invention may be explained by the standard specifications.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention.

The following detailed description includes specific terms in order to provide a thorough understanding of the present invention. However, it will be apparent to those skilled in the art that the specific terms may be replaced with other terms without departing the technical spirit and scope of the present invention.

For example, the term used in embodiments of the present invention, 'synchronization signal' is interchangeable with a synchronization sequence, a training symbol or a synchronization preamble in the same meaning.

The embodiments of the present invention can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present invention are described in the context of a 3GPP LTE/LTE-A system in order to clarify the technical features of the present invention, the present invention is also applicable to an IEEE 802.16e/m system, etc.

1. 3GPP LTE/LTE-A System

In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

1.1 System Overview

FIG. 1 illustrates physical channels and a general method using the physical channels, which may be used in embodiments of the present invention.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

Figure 2:
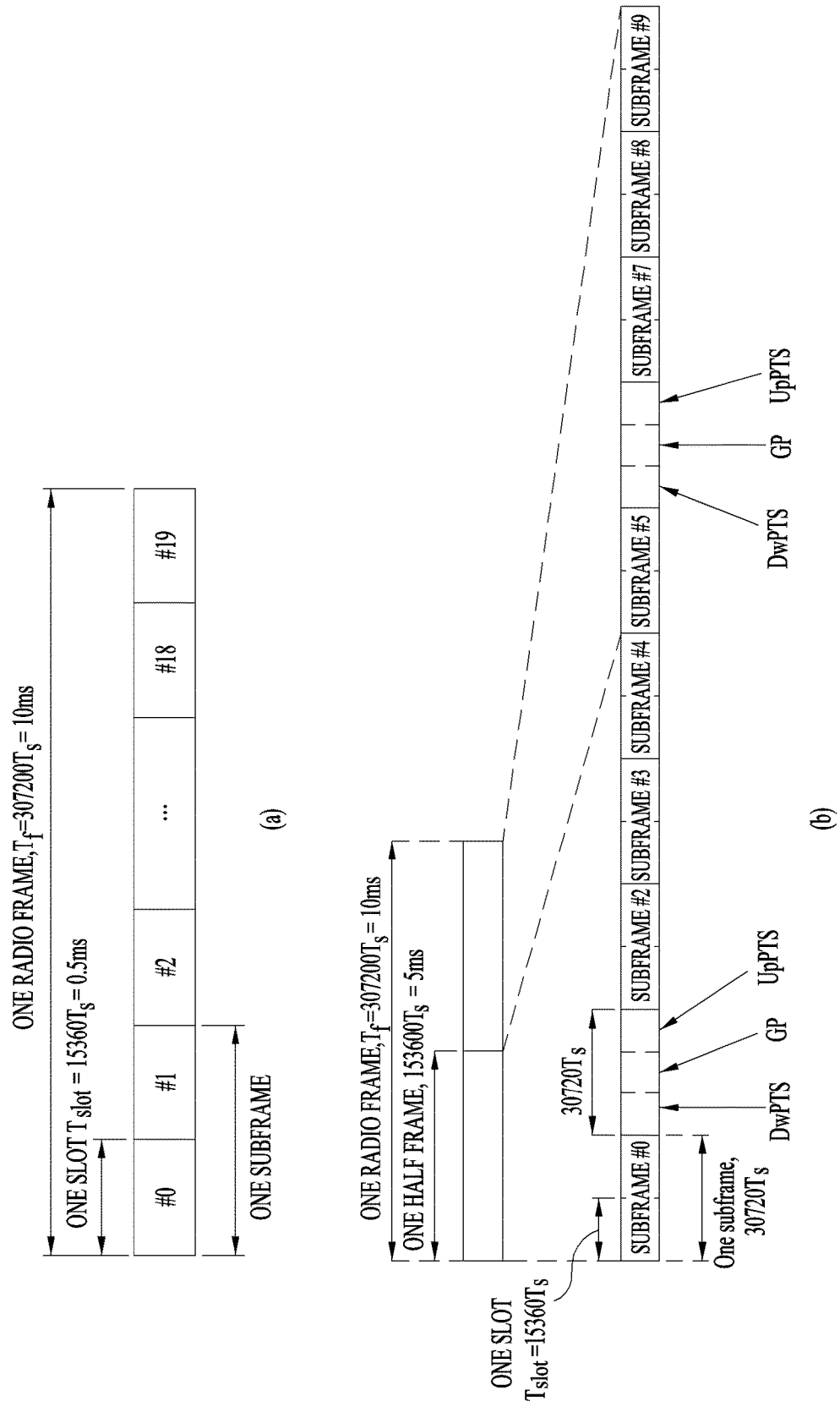
FIG. 2 illustrates radio frame structures used in embodiments of the present invention.

FIG. 2 illustrates exemplary radio frame structures used in embodiments of the present invention.

FIG. 2(a) illustrates frame structure type 1. Frame structure type 1 is applicable to both a full Frequency Division Duplex (FDD) system and a half FDD system.

One radio frame is 10 ms ($T_f=307200 \cdot T_s$) long, including equal-sized 20 slots indexed from 0 to 19. Each slot is 0.5 ms ($T_{slot}=15360 \cdot T_s$) long. One subframe includes two successive slots. An $i^{th}$ subframe includes $2i^{th}$ and $(2i+1)^{th}$ slots. That is, a radio frame includes 10 subframes. A time required for transmitting one subframe is defined as a Transmission Time Interval (TTI). Ts is a sampling time given as $T_s=1/(15 \text{ kHz} \times 2048)=3.2552 \times 10^{-8}$ (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms ($T_f=307200 \cdot T_s$) long, including two half-frames each having a length of 5 ms ($=153600 \cdot T_s$) long. Each half-frame includes five subframes each being 1 ms ($=30720 \cdot T_s$) long. An subframe includes $2i^{th}$ and $(2i+1)^{th}$ slots each having a length of 0.5 ms ($T_{slot}=15360 \cdot T_s$). $T_s$ is a sampling time given as $T_s=1/(15 \text{ kHz} \times 2048)=3.2552 \times 10^{-8}$ (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

TABLE 1

| Special subframe configuration | Normal cyclic prefix in downlink | | | Extended cyclic prefix in downlink | | |
| --- | --- | --- | --- | --- | --- | --- |
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

Figure 3:
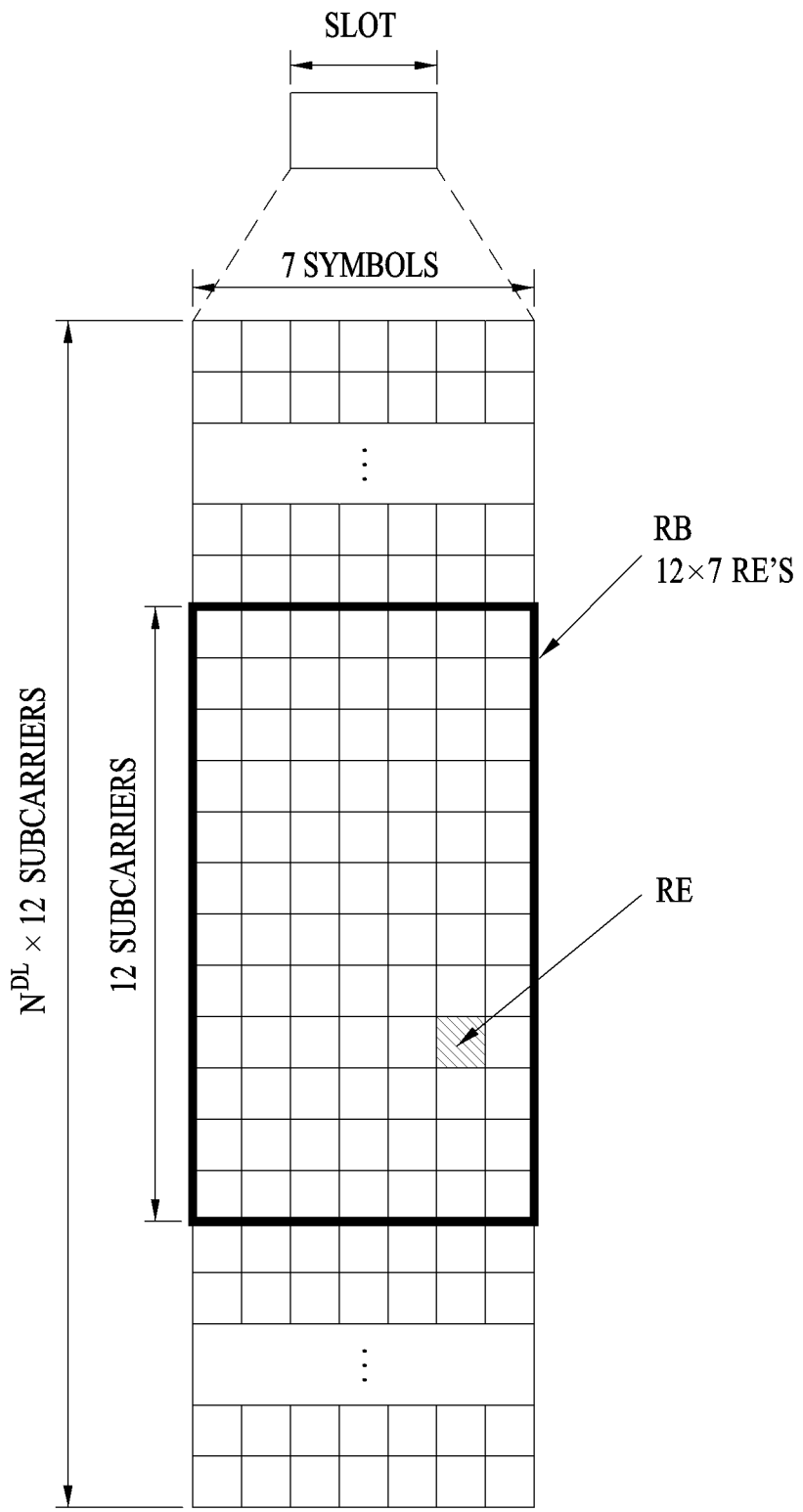
FIG. 3 illustrates a structure of a DownLink (DL) resource grid for the duration of one DL slot, which may be used in embodiments of the present invention.

FIG. 3 illustrates an exemplary structure of a DL resource grid for the duration of one DL slot, which may be used in embodiments of the present invention.

Referring to FIG. 3, a DL slot includes a plurality of OFDM symbols in the time domain. One DL slot includes 7 OFDM symbols in the time domain and an RB includes 12 subcarriers in the frequency domain, to which the present invention is not limited.

Each element of the resource grid is referred to as a Resource Element (RE). An RB includes 12×7 REs. The number of RBs in a DL slot, NDL depends on a DL transmission bandwidth. A UL slot may have the same structure as a DL slot.

Figure 4:
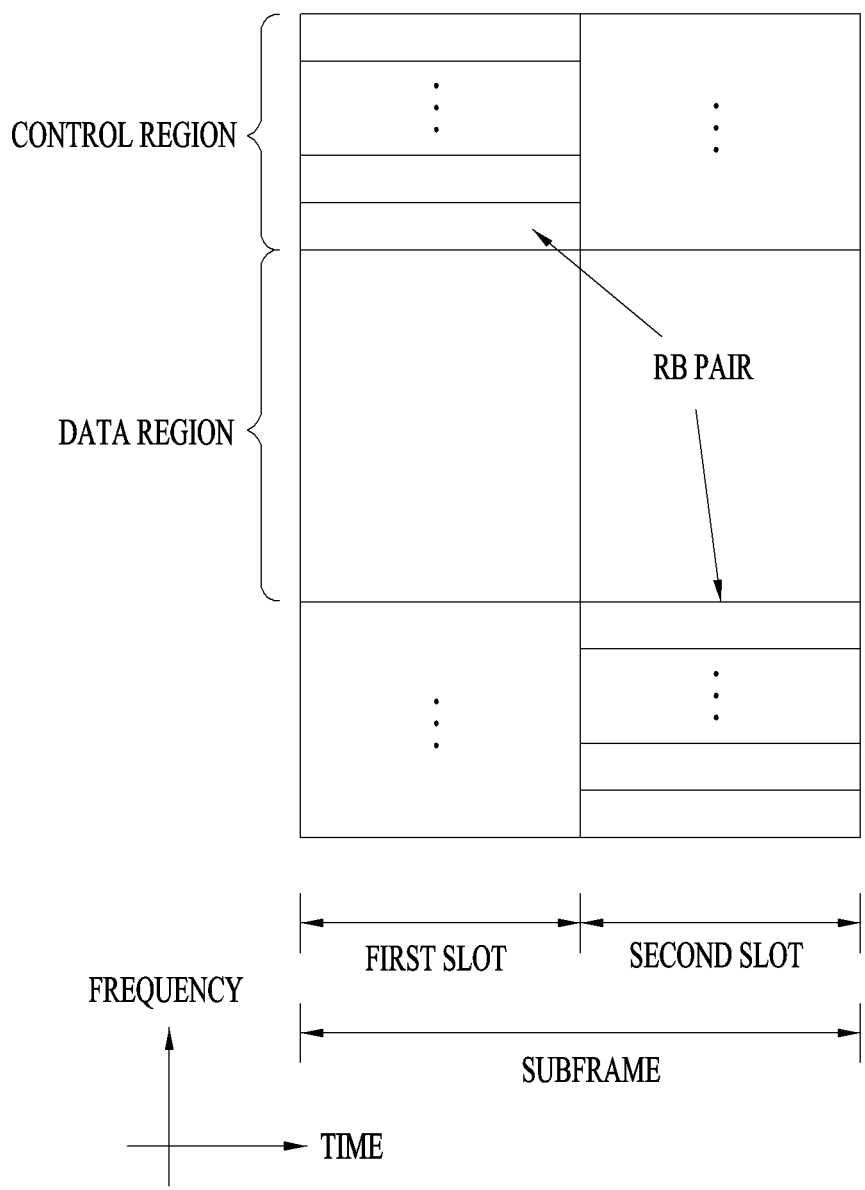
FIG. 4 illustrates a structure of an UpLink (UL) subframe, which may be used in embodiments of the present invention.

FIG. 4 illustrates a structure of a UL subframe which may be used in embodiments of the present invention.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
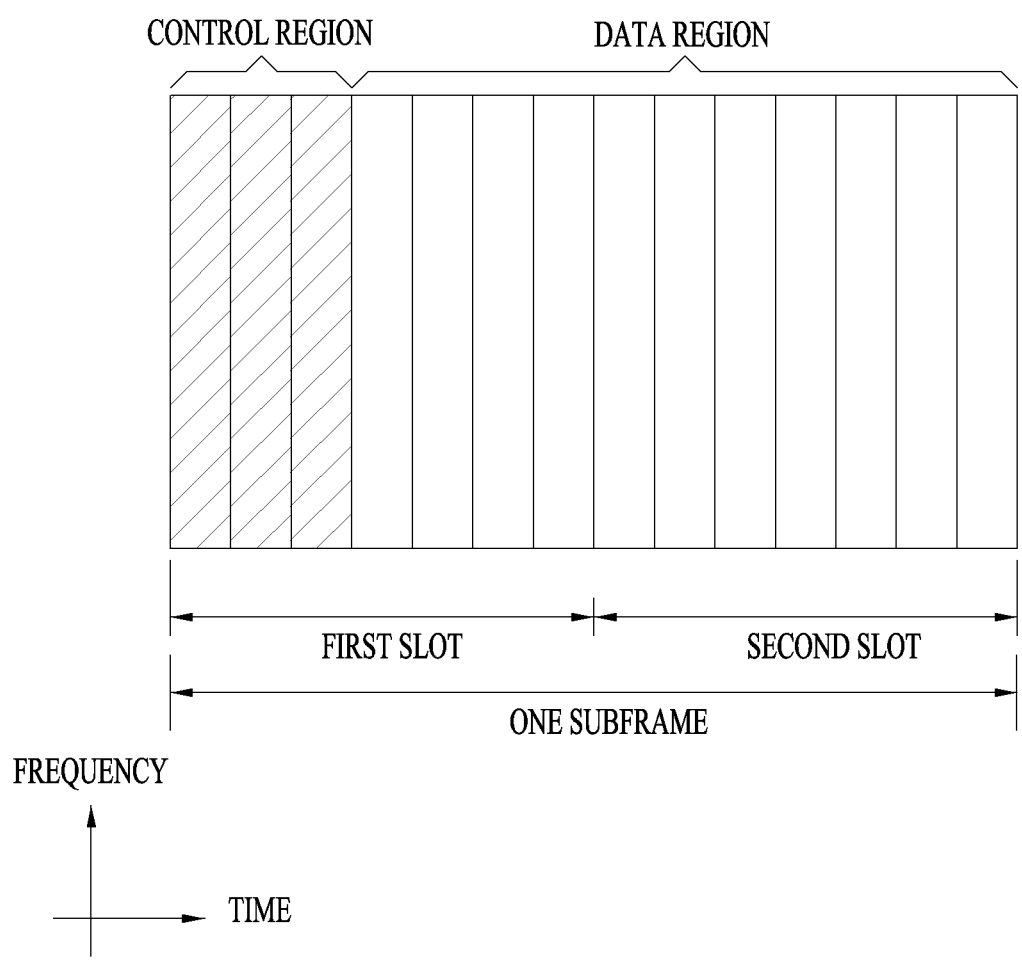
FIG. 5 illustrates a structure of a DL subframe, which may be used in embodiments of the present invention.

FIG. 5 illustrates a structure of a DL subframe that may be used in embodiments of the present invention.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

2. Carrier Aggregation (CA) Environment 2.1 CA Overview

A 3GPP LTE system (conforming to Rel-8 or Rel-9) (hereinafter, referred to as an LTE system) uses Multi-Carrier Modulation (MCM) in which a single Component Carrier (CC) is divided into a plurality of bands. In contrast, a 3GPP LTE-A system (hereinafter, referred to an LTE-A system) may use CA by aggregating one or more CCs to support a broader system bandwidth than the LTE system. The term CA is interchangeably used with carrier combining, multi-CC environment, or multi-carrier environment.

In the present invention, multi-carrier means CA (or carrier combining). Herein, CA covers aggregation of contiguous carriers and aggregation of non-contiguous carriers. The number of aggregated CCs may be different for a DL and a UL. If the number of DL CCs is equal to the number of UL CCs, this is called symmetric aggregation. If the number of DL CCs is different from the number of UL CCs, this is called asymmetric aggregation. The term CA is interchangeable with carrier combining, bandwidth aggregation, spectrum aggregation, etc.

The LTE-A system aims to support a bandwidth of up to 100 MHz by aggregating two or more CCs, that is, by CA. To guarantee backward compatibility with a legacy IMT system, each of one or more carriers, which has a smaller bandwidth than a target bandwidth, may be limited to a bandwidth used in the legacy system.

For example, the legacy 3GPP LTE system supports bandwidths {1.4, 3, 5, 10, 15, and 20 MHz} and the 3GPP LTE-A system may support a broader bandwidth than 20 MHz using these LTE bandwidths. A CA system of the present invention may support CA by defining a new bandwidth irrespective of the bandwidths used in the legacy system.

There are two types of CA, intra-band CA and inter-band CA. Intra-band CA means that a plurality of DL CCs and/or UL CCs are successive or adjacent in frequency. In other words, the carrier frequencies of the DL CCs and/or UL CCs are positioned in the same band. On the other hand, an environment where CCs are far away from each other in frequency may be called inter-band CA. In other words, the carrier frequencies of a plurality of DL CCs and/or UL CCs are positioned in different bands. In this case, a UE may use a plurality of Radio Frequency (RF) ends to conduct communication in a CA environment.

The LTE-A system adopts the concept of cell to manage radio resources. The above-described CA environment may be referred to as a multi-cell environment. A cell is defined as a pair of DL and UL CCs, although the UL resources are not mandatory. Accordingly, a cell may be configured with DL resources alone or DL and UL resources.

For example, if one serving cell is configured for a specific UE, the UE may have one DL CC and one UL CC. If two or more serving cells are configured for the UE, the UE may have as many DL CCs as the number of the serving cells and as many UL CCs as or fewer UL CCs than the number of the serving cells, or vice versa. That is, if a plurality of serving cells are configured for the UE, a CA environment using more UL CCs than DL CCs may also be supported.

CA may be regarded as aggregation of two or more cells having different carrier frequencies (center frequencies). Herein, the term 'cell' should be distinguished from 'cell' as a geographical area covered by an eNB. Hereinafter, intra-band CA is referred to as intra-band multi-cell and inter-band CA is referred to as inter-band multi-cell.

In the LTE-A system, a Primacy Cell (PCell) and a Secondary Cell (SCell) are defined. A PCell and an SCell may be used as serving cells. For a UE in RRC_CONNECTED state, if CA is not configured for the UE or the UE does not support CA, a single serving cell including only a PCell exists for the UE. On the contrary, if the UE is in RRC_CONNECTED state and CA is configured for the UE, one or more serving cells may exist for the UE, including a PCell and one or more SCells.

Serving cells (PCell and SCell) may be configured by an RRC parameter. A physical-layer ID of a cell, PhysCellId is an integer value ranging from 0 to 503. A short ID of an SCell, SCellIndex is an integer value ranging from 1 to 7. A short ID of a serving cell (PCell or SCell), ServeCellIndex is an integer value ranging from 1 to 7. If ServeCellIndex is 0, this indicates a PCell and the values of ServeCellIndex for SCells are pre-assigned. That is, the smallest cell ID (or cell index) of ServeCellIndex indicates a PCell.

A PCell refers to a cell operating in a primary frequency (or a primary CC). A UE may use a PCell for initial connection establishment or connection reestablishment. The PCell may be a cell indicated during handover. In addition, the PCell is a cell responsible for control-related communication among serving cells configured in a CA environment. That is, PUCCH allocation and transmission for the UE may take place only in the PCell. In addition, the UE may use only the PCell in acquiring system information or changing a monitoring procedure. An Evolved Universal Terrestrial Radio Access Network (E-UTRAN) may change only a PCell for a handover procedure by a higher-layer RRCConnectionReconfiguraiton message including mobilityControlInfo to a UE supporting CA.

An SCell may refer to a cell operating in a secondary frequency (or a secondary CC). Although only one PCell is allocated to a specific UE, one or more SCells may be allocated to the UE. An SCell may be configured after RRC connection establishment and may be used to provide additional radio resources. There is no PUCCH in cells other than a PCell, that is, in SCells among serving cells configured in the CA environment.

When the E-UTRAN adds an SCell to a UE supporting CA, the E-UTRAN may transmit all system information related to operations of related cells in RRC_CONNECTED state to the UE by dedicated signaling. Changing system information may be controlled by releasing and adding a related SCell. Herein, a higher-layer RRCConnectionReconfiguration message may be used. The E-UTRAN may transmit a dedicated signal having a different parameter for each cell rather than it broadcasts in a related SCell.

After an initial security activation procedure starts, the E-UTRAN may configure a network including one or more SCells by adding the SCells to a PCell initially configured during a connection establishment procedure. In the CA environment, each of a PCell and an SCell may operate as a CC. Hereinbelow, a Primary CC (PCC) and a PCell may be used in the same meaning and a Secondary CC (SCC) and an SCell may be used in the same meaning in embodiments of the present invention.

2.2 Cross Carrier Scheduling

Two scheduling schemes, self-scheduling and cross carrier scheduling are defined for a CA system, from the perspective of carriers or serving cells. Cross carrier scheduling may be called cross CC scheduling or cross cell scheduling.

In self-scheduling, a PDCCH (carrying a DL grant) and a PDSCH are transmitted in the same DL CC or a PUSCH is transmitted in a UL CC linked to a DL CC in which a PDCCH (carrying a UL grant) is received.

In cross carrier scheduling, a PDCCH (carrying a DL grant) and a PDSCH are transmitted in different DL CCs or a PUSCH is transmitted in a UL CC other than a UL CC linked to a DL CC in which a PDCCH (carrying a UL grant) is received.

Cross carrier scheduling may be activated or deactivated UE-specifically and indicated to each UE semi-statically by higher-layer signaling (e.g. RRC signaling).

If cross carrier scheduling is activated, a Carrier Indicator Field (CIF) is required in a PDCCH to indicate a DL/UL CC in which a PDSCH/PUSCH indicated by the PDCCH is to be transmitted. For example, the PDCCH may allocate PDSCH resources or PUSCH resources to one of a plurality of CCs by the CIF. That is, when a PDCCH of a DL CC allocates PDSCH or PUSCH resources to one of aggregated DL/UL CCs, a CIF is set in the PDCCH. In this case, the DCI formats of LTE Release-8 may be extended according to the CIF. The CIF may be fixed to three bits and the position of the CIF may be fixed irrespective of a DCI format size. In addition, the LTE Release-8 PDCCH structure (the same coding and resource mapping based on the same CCEs) may be reused.

On the other hand, if a PDCCH transmitted in a DL CC allocates PDSCH resources of the same DL CC or allocates PUSCH resources in a single UL CC linked to the DL CC, a CIF is not set in the PDCCH. In this case, the LTE Release-8 PDCCH structure (the same coding and resource mapping based on the same CCEs) may be used.

If cross carrier scheduling is available, a UE needs to monitor a plurality of PDCCHs for DCI in the control region of a monitoring CC according to the transmission mode and/or bandwidth of each CC. Accordingly, an appropriate SS configuration and PDCCH monitoring are needed for the purpose.

In the CA system, a UE DL CC set is a set of DL CCs scheduled for a UE to receive a PDSCH, and a UE UL CC set is a set of UL CCs scheduled for a UE to transmit a PUSCH. A PDCCH monitoring set is a set of one or more DL CCs in which a PDCCH is monitored. The PDCCH monitoring set may be identical to the UE DL CC set or may be a subset of the UE DL CC set. The PDCCH monitoring set may include at least one of the DL CCs of the UE DL CC set. Or the PDCCH monitoring set may be defined irrespective of the UE DL CC set. DL CCs included in the PDCCH monitoring set may be configured to always enable self-scheduling for UL CCs linked to the DL CCs. The UE DL CC set, the UE UL CC set, and the PDCCH monitoring set may be configured UE-specifically, UE group-specifically, or cell-specifically.

If cross carrier scheduling is deactivated, this implies that the PDCCH monitoring set is always identical to the UE DL CC set. In this case, there is no need for signaling the PDCCH monitoring set. However, if cross carrier scheduling is activated, the PDCCH monitoring set is preferably defined within the UE DL CC set. That is, the eNB transmits a PDCCH only in the PDCCH monitoring set to schedule a PDSCH or PUSCH for the UE.

Figure 6:
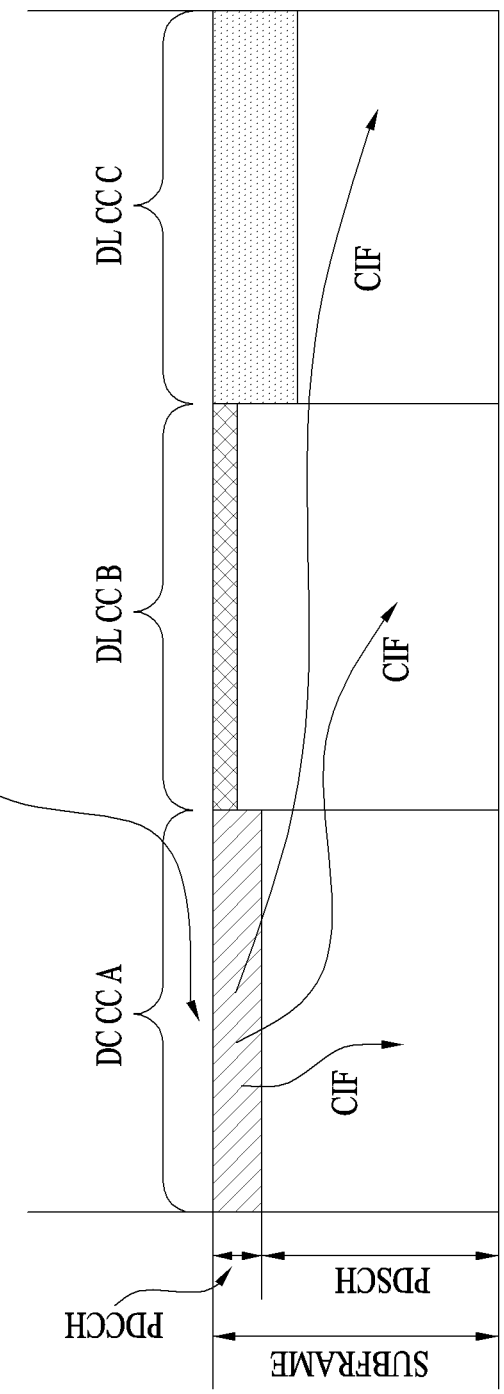
FIG. 6 illustrates a cross carrier-scheduled subframe structure in the LTE-A system, which is used in embodiments of the present invention.

FIG. 6 illustrates a cross carrier-scheduled subframe structure in the LTE-A system, which is used in embodiments of the present invention.

Referring to FIG. 6, three DL CCs are aggregated for a DL subframe for LTE-A UEs. DL CC 'A' is configured as a PDCCH monitoring DL CC. If a CIF is not used, each DL CC may deliver a PDCCH that schedules a PDSCH in the same DL CC without a CIF. On the other hand, if the CIF is used by higher-layer signaling, only DL CC 'A' may carry a PDCCH that schedules a PDSCH in the same DL CC 'A' or another CC. Herein, no PDCCH is transmitted in DL CC 'B' and DL CC 'C' that are not configured as PDCCH monitoring DL CCs.

3. Synchronization Channel (SCH) in Super-High Frequency Band 3.1 Carrier Frequency Offset (CFO)

An oscillator error value between a UE and an eNB is defined in the LTE-A system. For example, the 3GPP TS 36.101 standard specification requires that a UE should have an accuracy equal to or below ±0.1 ppm during one slot duration, compared to a carrier frequency received from an E-UTRA Node B. Also, the 3GPP TS 36.104 standard specification defines a frequency error as the difference between an allocated frequency and an actual transmission frequency of an eNB.

[Table 2] below lists oscillator accuracies according to BS types.

TABLE 2

| BS type | Accuracy |
| --- | --- |
| Wide Area BS | ±0.05 ppm |
| Local Area BS | ±0.1 ppm |
| Home BS | ±0.25 ppm |

Therefore, a maximum oscillator error between a UE and an eNB is ±0.1 ppm. If an error is generated in one direction, an offset of up to 0.2 ppm may be given. This ppm value is converted to Hz according to each center frequency by [Center Frequency×Frequency Offset (ppm)]. Meanwhile, an OFDM system experiences a different effect of a CFO value according to a subcarrier spacing.

For example, an OFDM system having a large subcarrier spacing is not affected much by a large CFO value. In this context, it is necessary to represent an actual CFO value (an absolute value) as a relative value that affects the OFDM system. This relative value may be referred to as a normalized CFO expressed as [CFO (Hz)/subcarrier spacing].

[Table 3] lists CFO values according to center frequencies and oscillator offset values.

TABLE 3

| Center frequency (subcarrier spacing) | Oscillator offset | | | |
| --- | --- | --- | --- | --- |
| | ±0.05 ppm | ±0.1 ppm | ±10 ppm | ±20 ppm |
| 2 GHz (15 kHz) | ±100 Hz (±0.0067) | ±200 Hz (±0.0133) | ±20 kHz (±1.3) | ±40 kHz (±2.7) |
| 30 GHz (104.25 kHz) | ±1.5 kHz (±0.014) | ±3 kHz (±0.029) | ±300 kHz (±2.9) | ±600 kHz (±5.8) |
| 60 GHz (104.25 kHz) | ±3 kHz (±0.029) | ±6 kHz (±0.058) | ±600 kHz (±5.8) | ±1.2 MHz (±11.5) |

[Table 3] lists difference CFO values and normalized CFO values with respect to center frequencies and oscillator offset values. The value of a bracket beside each CFO value indicates a normalized CFO value. In [Table 3], a subcarrier spacing of 15 kH used in LTE Rel-8/9/10 is assumed for a center frequency of 2 GHz, and a subcarrier spacing of 104.25 kH is assumed for center frequencies of 30 GHz and 60 GHz in consideration of the Doppler effect in order to prevent performance degradation. However, these subcarrier spacings are merely exemplary and thus other subcarrier spacings may be applied to the center frequencies. For the convenience of description, the following description is given in the context of a normalized CFO value. Unless otherwise mentioned, a CFO value means a normalized CFO value.

In embodiments of the present invention, CFOs may be divided into integer-multiple CFOs and decimal-multiple CFOs. An integer-multiple CFO is a CFO having a value equal to or larger than integer 1 and a decimal-multiple CFO is a CFO having a fractional value less than integer 1. An integer-multiple CFO is represented as a shift of as many subcarriers as an integer multiple for each integer and a decimal-multiple CFO is represented as a shift of as many subcarriers as a decimal multiple.

CFO estimation techniques have their own limitations in an estimation range. The estimation range is determined according to the number of repetitions of a signal used for CFO estimation in one OFDM symbol. If a CFO larger than the estimation range is generated, estimation performance is remarkably decreased. For example, if a CFO is estimated using a Cyclic Prefix (CP), one repetition is observed in an OFDM symbol and thus the estimation range is ±0.5. That is, if a synchronization signal, a sequence, a preamble, or a training symbol is repeated n times in an OFDM symbol, the estimation range is given as n×±0.5. For an oscillator offset of 10 ppm for a center frequency of 30 GHz in [Table 3], the CFO value is ±2.9. Thus, the CP-based estimation technique is not viable for CFO estimation. The CFO should be estimated using a signal, sequence, preamble, or training symbol repeated at least 6 times in one OFDM symbol.

Accordingly, there is a need for a new synchronization signal, preamble, or training symbol in order to estimate/correct a CFO in a super-high frequency wireless access system. A detailed description will be given of a method for configuring a synchronization signal for CFO estimation in a super-high frequency wireless access system. Also, a procedure for acquiring synchronization in the super-high frequency wireless access system will be described below.

3.2 Synchronization Signal

A synchronization sequence is defined for use in generating a synchronization signal transmitted on an SCH. Although many types of sequences are available in the present invention, a Secondary Synchronization Signal (SSS) used in the LTE system will be taken as an example. The SSS is an m-sequence series in the LTE system. However, the present invention is not limited to the m-sequence series and a Barker sequence, a Gold sequence, a Zadoff-chu sequence, etc. may be used. Further, even though an m-sequence is used, a different initial seed from that of the SSS or a structure having a different sequence length from that of the SSS may be used.

A synchronization sequence $d(0), \ldots, d(61)$ used for the SSS is two 31-bit sequences which are concatenated and interleaved. The concatenated sequence is scrambled with a scrambling sequence indicated by a Primary Synchronization Signal (PSS).

The concatenated two sequences of length 31 that define the SSS are differently defined in subframe 0 and subframe 5. The SSS is determined according to [Equation 1]

$$d(2n) = \begin{cases} s_0^{(m_0)}(n)c_0(n) & \text{in subframe 0} \\ s_1^{(m_1)}(n)c_0(n) & \text{in subframe 5} \end{cases} \quad \text{[Equation 1]}$$

-continued
$$d(2n+1) = \begin{cases} s_1^{(m_1)}(n)c_1(n)z_1^{(m_0)}(n) & \text{in subframe 0} \\ s_0^{(m_0)}(n)c_1(n)z_1^{(m_1)}(n) & \text{in subframe 5} \end{cases}$$

In [Equation 1], $0 \leq n \leq 30$ and indexes $m_0$ and $m_1$ are derived from a physical-layer cell Identifier (ID) group $N_{ID}^{(1)}$ by the following equation.

$$m_0 = m' \bmod 31 \quad \text{[Equation 2]}$$
$$m_1 = (m_0 + \lfloor m'/31 \rfloor + 1) \bmod 31$$
$$m' = N_{ID}^{(1)} + q(q+1)/2,$$
$$q = \left\lfloor \frac{N_{ID}^{(1)} + q'(q'+1)/2}{30} \right\rfloor, q' = \lfloor N_{ID}^{(1)}/30 \rfloor$$

Values of $m_0$ and $m_1$ derived according to [Equation 2] are listed in [Table 4] which will be described below. Two sequences of length 31, $s_0^{(m_0)}(n)$ and $s_1^{(m_1)}(n)$ are two different cyclically shifted sequences of an m-sequence $\tilde{s}(n)$, defined by [Equation 3].

$$s_0^{(m_0)}(n) = \tilde{s}((n+m_0) \bmod 31)$$
$$s_1^{(m_1)}(n) = \tilde{s}((n+m_1) \bmod 31) \quad \text{[Equation 3]}$$

In [Equation 3], the m sequence $\tilde{s}(i) = 1 - 2x(i)$ $(0 \leq i \leq 30)$ and $x(i)$ is defined by the following equation.

$$x(\bar{i}+5) = (x(\bar{i}+2)+x(\bar{i})) \bmod 2, 0 \leq \bar{i} \leq 25 \quad \text{[Equation 4]}$$

In [Equation 4], initial conditions are set so that $x(0)=0$, $x(1)=0$, $x(2)=0$, $x(3)=0$, and $x(4)=1$.

Two scrambling sequences $c_0(n)$ and $c_1(n)$ described in [Equation 1] are defined according to the PSS and defined by two different cyclic shifts of the m-sequence $\tilde{c}(n)$ according to [Equation 5].

$$c_0(n) = \tilde{c}((n+N_{ID}^{(2)}) \bmod 31)$$
$$c_1(n) = \tilde{c}((n+N_{ID}^{(2)}+3) \bmod 31) \quad \text{[Equation 5]}$$

$N_{ID}^{(2)} \in \{0,1,2\}$ is a physical-layer cell ID in the physical-layer cell ID group $N_{ID}^{(1)}$. The m-sequence $\tilde{c}(i)=1-2x(i)$ $(0 \leq i \leq 30)$ and $x(i)$ is defined by [Equation 6]

$$x(\bar{i}+5) = (x(\bar{i}+3)+x(\bar{i})) \bmod 2, 0 \leq \bar{i} \leq 25 \quad \text{[Equation 6]}$$

In [Equation 6], initial conditions are set so that $x(0)=0$, $x(1)=0$, $x(2)=0$, $x(3)=0$, and $x(4)=1$.

Scrambling sequences $z_1^{(m_0)}(n)$ and $z_1^{(m_1)}(n)$ described in [Equation 1] are defined by cyclic shifts of an m-sequence $\tilde{z}(n)$ according to [Equation 7].

$$z_1^{(m_0)}(n) = \tilde{z}((n+(m_0 \bmod 8)) \bmod 31)$$
$$z_1^{(m_1)}(n) = \tilde{z}((n+(m_1 \bmod 8)) \bmod 31) \quad \text{[Equation 7]}$$

In [Equation 7], the values of $m_0$ and $m_1$ are acquired from [Table 4] and the m-sequence=$\tilde{z}(i)=1-2x(i)$ $(0 \leq i \leq 30)$ is defined by [Equation 8].

$$x(\bar{i}+5) = (x(\bar{i}+4)+x(\bar{i}+2)+x(\bar{i}+1)+x(\bar{i})) \bmod 2, 0 \leq \bar{i} \leq 25 \quad \text{[Equation 8]}$$

In [Equation 8], initial conditions are set so that $x(0)=0$, $x(1)=0$, $x(2)=0$, $x(3)=0$, and $x(4)=1$. [Table 4] illustrates a mapping relationship between the values of $m_0$ and $m_1$ derived by [Equation 2] and physical-layer cell ID groups $N_{ID}^{(1)}$.

TABLE 4

| $N_{ID}^{(1)}$ | $m_0$ | $m_1$ |
|---|---|---|
| 0 | 0 | 1 |
| 1 | 1 | 2 |
| 2 | 2 | 3 |
| 3 | 3 | 4 |
| 4 | 4 | 5 |
| 5 | 5 | 6 |
| 6 | 6 | 7 |
| 7 | 7 | 8 |
| 8 | 8 | 9 |
| 9 | 9 | 10 |
| 10 | 10 | 11 |
| 11 | 11 | 12 |
| 12 | 12 | 13 |
| 13 | 13 | 14 |
| 14 | 14 | 15 |
| 15 | 15 | 16 |
| 16 | 16 | 17 |
| 17 | 17 | 18 |
| 18 | 18 | 19 |
| 19 | 19 | 20 |
| 20 | 20 | 21 |
| 21 | 21 | 22 |
| 22 | 22 | 23 |
| 23 | 23 | 24 |
| 24 | 24 | 25 |
| 25 | 25 | 26 |
| 26 | 26 | 27 |
| 27 | 27 | 28 |
| 28 | 28 | 29 |
| 29 | 29 | 30 |
| 30 | 0 | 2 |
| 31 | 1 | 3 |
| 32 | 2 | 4 |
| 33 | 3 | 5 |
| 34 | 4 | 6 |
| 35 | 5 | 7 |
| 36 | 6 | 8 |
| 37 | 7 | 9 |
| 38 | 8 | 10 |
| 39 | 9 | 11 |
| 40 | 10 | 12 |
| 41 | 11 | 13 |
| 42 | 12 | 14 |
| 43 | 13 | 15 |
| 44 | 14 | 16 |
| 45 | 15 | 17 |
| 46 | 16 | 18 |
| 47 | 17 | 19 |
| 48 | 18 | 20 |
| 49 | 19 | 21 |
| 50 | 20 | 22 |
| 51 | 21 | 23 |
| 52 | 22 | 24 |
| 53 | 23 | 25 |
| 54 | 24 | 26 |
| 55 | 25 | 27 |
| 56 | 26 | 28 |
| 57 | 27 | 29 |
| 58 | 28 | 30 |
| 59 | 0 | 3 |
| 60 | 1 | 4 |
| 61 | 2 | 5 |
| 62 | 3 | 6 |
| 63 | 4 | 7 |
| 64 | 5 | 8 |
| 65 | 6 | 9 |
| 66 | 7 | 10 |
| 67 | 8 | 11 |
| 68 | 9 | 12 |
| 69 | 10 | 13 |
| 70 | 11 | 14 |
| 71 | 12 | 15 |
| 72 | 13 | 16 |
| 73 | 14 | 17 |
| 74 | 15 | 18 |
| 75 | 16 | 19 |
| 76 | 17 | 20 |
| 77 | 18 | 21 |
| 78 | 19 | 22 |
| 79 | 20 | 23 |
| 80 | 21 | 24 |
| 81 | 22 | 25 |
| 82 | 23 | 26 |
| 83 | 24 | 27 |
| 84 | 25 | 28 |
| 85 | 26 | 29 |
| 86 | 27 | 30 |
| 87 | 0 | 4 |
| 88 | 1 | 5 |
| 89 | 2 | 6 |
| 90 | 3 | 7 |
| 91 | 4 | 8 |
| 92 | 5 | 9 |
| 93 | 6 | 10 |
| 94 | 7 | 11 |
| 95 | 8 | 12 |
| 96 | 9 | 13 |
| 97 | 10 | 14 |
| 98 | 11 | 15 |
| 99 | 12 | 16 |
| 100 | 13 | 17 |
| 101 | 14 | 18 |
| 102 | 15 | 19 |
| 103 | 16 | 20 |
| 104 | 17 | 21 |
| 105 | 18 | 22 |
| 106 | 19 | 23 |
| 107 | 20 | 24 |
| 108 | 21 | 25 |
| 109 | 22 | 26 |
| 110 | 23 | 27 |
| 111 | 24 | 28 |
| 112 | 25 | 29 |
| 113 | 26 | 30 |
| 114 | 0 | 5 |
| 115 | 1 | 6 |
| 116 | 2 | 7 |
| 117 | 3 | 8 |
| 118 | 4 | 9 |
| 119 | 5 | 10 |
| 120 | 6 | 11 |
| 121 | 7 | 12 |
| 122 | 8 | 13 |
| 123 | 9 | 14 |
| 124 | 10 | 15 |
| 125 | 11 | 16 |
| 126 | 12 | 17 |
| 127 | 13 | 18 |
| 128 | 14 | 19 |
| 129 | 15 | 20 |
| 130 | 16 | 21 |
| 131 | 17 | 22 |
| 132 | 18 | 23 |
| 133 | 19 | 24 |
| 134 | 20 | 25 |
| 135 | 21 | 26 |
| 136 | 22 | 27 |
| 137 | 23 | 28 |
| 138 | 24 | 29 |
| 139 | 25 | 30 |
| 140 | 0 | 6 |
| 141 | 1 | 7 |
| 142 | 2 | 8 |
| 143 | 3 | 9 |
| 144 | 4 | 10 |
| 145 | 5 | 11 |
| 146 | 6 | 12 |
| 147 | 7 | 13 |
| 148 | 8 | 14 |
| 149 | 9 | 15 |
| 150 | 10 | 16 |
| 151 | 11 | 17 |
| 152 | 12 | 18 |
| 153 | 13 | 19 |
| 154 | 14 | 20 |
| 155 | 15 | 21 |

TABLE 4-continued

| $N_{ID}^{(1)}$ | $m_0$ | $m_1$ |
|---|---|---|
| 156 | 16 | 22 |
| 157 | 17 | 23 |
| 158 | 18 | 24 |
| 159 | 19 | 25 |
| 160 | 20 | 26 |
| 161 | 21 | 27 |
| 162 | 22 | 28 |
| 163 | 23 | 29 |
| 164 | 24 | 30 |
| 165 | 0 | 7 |
| 166 | 1 | 8 |
| 167 | 2 | 9 |
| — | — | — |
| — | — | — |

The synchronization sequence d(n) generated in the above manner is mapped to an OFDM symbol as follows. The synchronization sequence is mapped to REs differently according to a frame structure. One subframe is used for the SSS in frame structure type 1 and a half frame is used for the SSS in frame structure type 2. The same antenna port as used for the PSS is used to transmit the SSS.

The synchronization sequence d(n) is mapped to REs according to [Equation 9]

$$a_{k,l} = d(n), n = 0, \ldots, 61 \quad \text{[Equation 9]}$$

$$k = n - 31 + \frac{N_{RB}^{DL} N_{sc}^{RB}}{2}$$

$$l = \begin{cases} N_{symb}^{DL} - 2 & \text{in slots 0 and 10 for frame structure type 1} \\ N_{symb}^{DL} - 1 & \text{in slots 1 and 11 for frame structure type 2} \end{cases}$$

However, RE (k, 1) derived from [Equation 10] is not used for SSS transmission but reserved.

$$k = n - 31 + \frac{N_{RB}^{DL} N_{sc}^{RB}}{2} \quad \text{[Equation 10]}$$

$$l = \begin{cases} N_{symb}^{DL} - 2 & \text{in slots 0 and 10 for frame structure type 1} \\ N_{symb}^{DL} - 1 & \text{in slots 1 and 11 for frame structure type 2} \end{cases}$$

$$n = -5, -4, \ldots, -1, 62, 63, \ldots 66$$

3.3. Repetitive Synchronization Signal—1

The method for generating a synchronization signal has been described in Clause 3.2. Now, a detailed description will be given of various methods for generating a repetitive synchronization signal for use in a super-high frequency wireless access system.

The repetitive synchronization signal is basically generated according to the method for generating a synchronization signal described in Clause 3.2 and constructed with a repeated sequence to estimate and/or correct an oscillator error between an eNB and a UE or the Doppler effect. That is, the eNB and/or the UE may detect a CFO value caused by an oscillator error or the Doppler effect in a super-high frequency band by transmitting a repetitive synchronization signal which is repeated.

Figure 7:
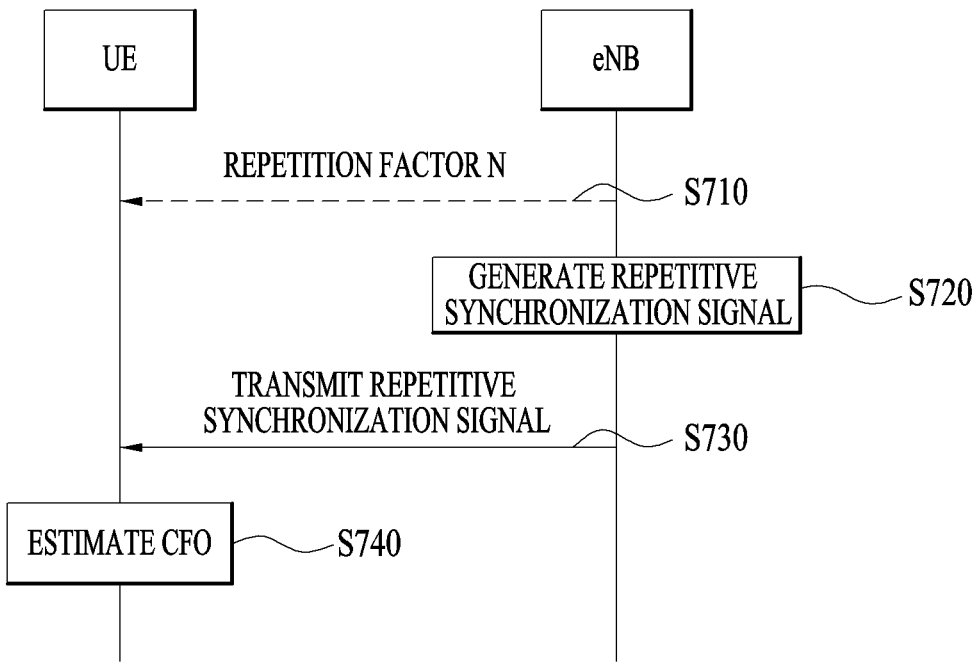
FIG. 7 is a diagram illustrating a signal flow for one of methods for generating a repetitive synchronization signal according to an embodiment of the present invention.

FIG. 7 illustrates one of methods for generating a repetitive synchronization signal according to an embodiment of the present invention.

Referring to FIG. 7, an eNB transmits a repetitive factor N to a UE by a higher-layer signal (e.g., an RRC signal or a MAC signal), for generating a repetitive synchronization sequence (S710).

Steps S710 is optional and thus may or may not be performed according to an embodiment of the present invention. For example, step S710 is not used during an initial cell search procedure. In this case, the eNB may generate a repetitive synchronization signal having a repetitive characteristic on a frequency band basis and/or a frame basis and transmit the repetitive synchronization signal to UEs within a cell. However, if synchronization to a neighbor eNB needs to be acquired, for example, for cell research or handover, the eNB may adaptively perform step S710 to adjust the repetition factor N.

The eNB generates a repetitive synchronization signal according to the repetition factor N (S720).

If the repetitive synchronization signal is configured using an SSS in step S720, a repetitive sequence may be configured by zero bit insertion, that is, by inserting as many '0' bits as a specific constant N between elements of the synchronization sequence that forms the SSS. The SSS sequence is repeated as many times as the number of the inserted '0' bits and the total length of the sequence is increased by N times from the length of the original sequence.

The repetitive synchronization signal repeated as many times as the repetition factor N may be generated by [Equation 11].

$$\tilde{d}(m) = \begin{cases} d\left(\frac{m}{N}\right) & \text{if } m \bmod N = 0 \\ 0 & \text{otherwise} \end{cases}, m = 0, \ldots, 61 \cdot (N+1) - 1 \quad \text{[Equation 11]}$$

$$a_{k,l} = \tilde{d}(m), m = 0, \ldots, 61 \cdot (N+1) - 1$$

$$k = m - 31 \cdot N + \frac{N_{RB}^{DL} N_{sc}^{RB}}{2}$$

$$l = \begin{cases} N_{symb}^{DL} - 2 & \text{in slots 0 and 10 for frame structure type 1} \\ N_{symb}^{DL} - 1 & \text{in slots 1 and 11 for frame structure type 2} \end{cases}$$

The eNB transmits the repetitive synchronization signal generated in step 720 to the UE (S730).

Upon receipt of the repetitive synchronization signal in step S730, the UE may estimate and/or correct the CFO of the signal transmitted in a super-high frequency band because the estimation range of the repetitive synchronization signal is increased as much as the repetition factor.

[Equation 11] includes OFDM symbol mapping after the zero bit insertion in the LTE/LTE-A system. Therefore, if the super-high frequency wireless access system has a different frame structure from that of the LTE/LTE-A system, the repetitive synchronization signal proposed by the present invention may be mapped to a different frequency area and/or a different time area prior to transmission. Herein, different values from k and l described in [Equation 11] may be used. Also, if a sequence other than the SSS is used as a base sequence for the repetitive synchronization signal, d(n) (n=0, . . . , 61) described in [Equation 11] may be changed and thus a sequence of a different length may be used.

Figure 8:
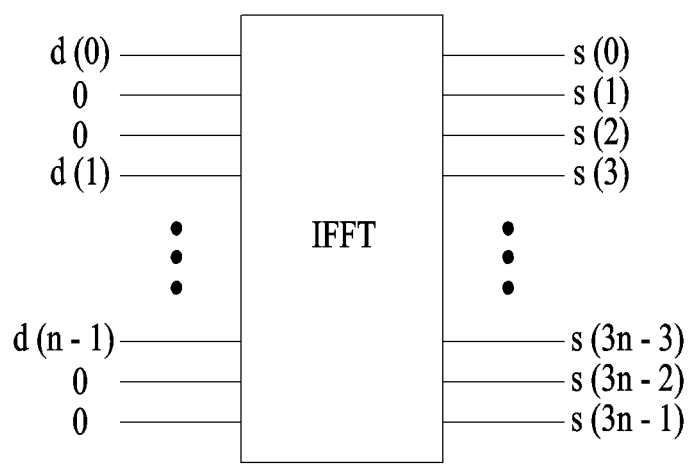
FIG. 8 illustrates an exemplary structure of an apparatus for modulating a repetitive synchronization signal to an Orthogonal Frequency Division Multiplexing (OFDM) symbol, which may be used in embodiments of the present invention.
Figure 9:
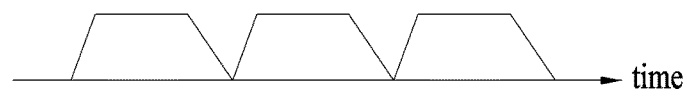
FIG. 9 illustrates a representation of a repetitive synchronization signal in the time domain.

FIG. 8 illustrates an exemplary structure of an apparatus for modulating a repetitive synchronization signal to an OFDM symbol, which may be used in embodiments of the present invention, and FIG. 9 illustrates a representation of a repetitive synchronization signal in the time domain.

A synchronization signal or training symbols are input/output to an Inverse Fast Fourier Transform (IFFT) module, for OFDM modulation. FIG. 8 illustrates a simplified structure of an IFFT module. The IFFT module modulates input repetitive synchronization sequences (d(0), 0, 0, d(1), d(n−1), 0, 0) to OFDM symbols s(0), s(1), s(2), ..., S(3n−3), S(3n−2), S(3n−1), for RE mapping. FIGS. 8 and 9 illustrate an example with a repetition factor N being 3.

3.4. Repetitive Synchronization Signal—2

A method for generating a repetitive synchronization signal by zero bit insertion has been described in Clause 3.3. Hereinbelow, a description will be given of a method for generating a repetitive synchronization signal by zero bit insertion in such a manner that the length of the repetitive synchronization signal may be equal to that of a pre-zero bit insertion sequence (i.e., the general synchronization signal).

For example, if the length of the original sequence is 'n', a repetitive synchronization signal of length 'n' may be generated by zero bit insertion. In this case, the repetitive synchronization signal may be generated by selecting only 'x' bits from the original sequence. Herein, 'x' is a largest integer satisfying (x×N)≤n where N is a repetition factor.

[Equation 12] describes another of the methods for generating a repetitive synchronization signal.

$$\tilde{d}(m) = \begin{cases} d\left(\dfrac{m}{N}\right) & \text{if } m \bmod N = 0 \\ 0 & \text{otherwise} \end{cases}, m = 0, \ldots, x \cdot (N+1) - 1$$

$$a_{k,l} = \tilde{d}(m), m = 0, \ldots, x \cdot (N+1) - 1$$

$$k = m - \dfrac{x}{2} \cdot N + \dfrac{N_{RB}^{DL} N_{sc}^{RB}}{2}$$

$$l = \begin{cases} N_{symb}^{DL} - 2 & \text{in slots 0 and 10 for frame structure type 1} \\ N_{symb}^{DL} - 1 & \text{in slots 1 and 11 for frame structure type 2} \end{cases}$$

[Equation 12]

3.5. Method for Transmitting Repetitive Synchronization Signal—1

Figure 10:
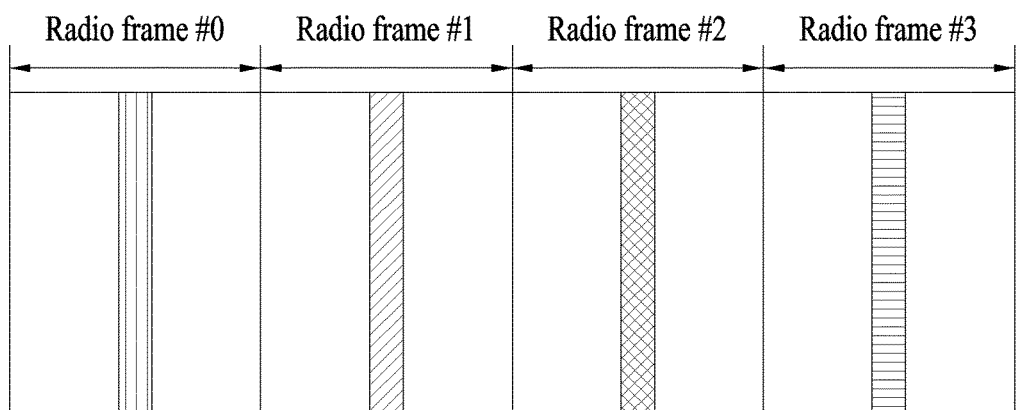
FIG. 10 illustrates one of methods for transmitting a repetitive synchronization signal having a repetitive characteristic according to an embodiment of the present invention.

FIG. 10 illustrates one of methods for transmitting a synchronization signal having a repetitive characteristic according to an embodiment of the present invention.

The constant N (i.e., the repetition factor) used for the repetitive characteristic of the repetitive synchronization signal may be used fixedly to each center frequency used in the super-high wireless access system or semi-statically to increase estimation performance. For example, the estimation range of a synchronization signal having a repetitive characteristic increases in proportion to N. Thus, although the synchronization signal can be estimated in the super-high frequency band, there is a limitation in detecting an accurate value. In other words, although the estimation range of the repetitive synchronization signal increases in proportion to the repetition factor N, the estimation performance may be placed in an inverse proportional relationship with N. Therefore, the estimation performance and the estimation range may be increased by using a synchronization signal having a different repetitive characteristic according to a center frequency.

That is, while a higher integer-multiple CFO can be estimated with a higher repetition factor, the estimation performance of a decimal-multiple CFO may be degraded. In the opposite case, while the estimation performance of a lower integer-multiple CFO or a decimal-multiple CFO can be increased with a lower repetition factor, the estimation performance of a higher integer-multiple CFO may be degraded. Accordingly, a synchronization signal may be configured to have a repetitive characteristic semi-statically according to a radio frame or a center frequency.

For example, a frame structure may be designed to have a different repetitive characteristic in each radio frame. Referring to FIG. 10, a synchronization signal may be transmitted without a repetitive characteristic in radio frame #0. Since the estimation range is ±0.5, a decimal-multiple CFO may be fine-estimated. A synchronization signal is repeated once in radio frame #1 and thus its estimation range is ±1.0. A synchronization signal may be repeated twice and three times respectively in radio frames #2 and #3. While a synchronization signal is shown in FIG. 10 as being repeated up to three times, the synchronization signal may be repeated up to N times according to system performance.

Repetitive synchronization signals transmitted in FIG. 10 may be generated using the method described in Clause 3.4. That is, the repetitive synchronization signals generated by zero bit insertion have lengths equal to those of their original synchronization signals.

If the repetitive synchronization signals used in FIG. 10 have lengths N times larger than the original synchronization signals after zero bit insertion as described in Clause 3.3, the number of synchronization signal samples may be set to be different in each radio frame.

3.6 Method for Transmitting Repetitive Synchronization Signal—2

An embodiment of the present invention described below is about methods for transmitting a repetitive synchronization signal only in a specific radio frame. Since the estimation performance of an integer-multiple CFO is not changed much, a repetitive synchronization signal may be transmitted only in a specific frame, not in every frame. That is, after an integer-multiple CFO is estimated once, a non-repetitive synchronization signal is transmitted in the other frames, so that a decimal-multiple CFO may be estimated or optimized.

For this purpose, the specific radio frame used to estimate an inter-multiple CFO may be fixed or configured periodically in the system. Or an eNB may transmit a repetitive synchronization signal only in a specific frame by dynamically or semi-statically signaling information about the frame carrying the repetitive synchronization signal for integer-multiple CFO estimation.

Figure 11:
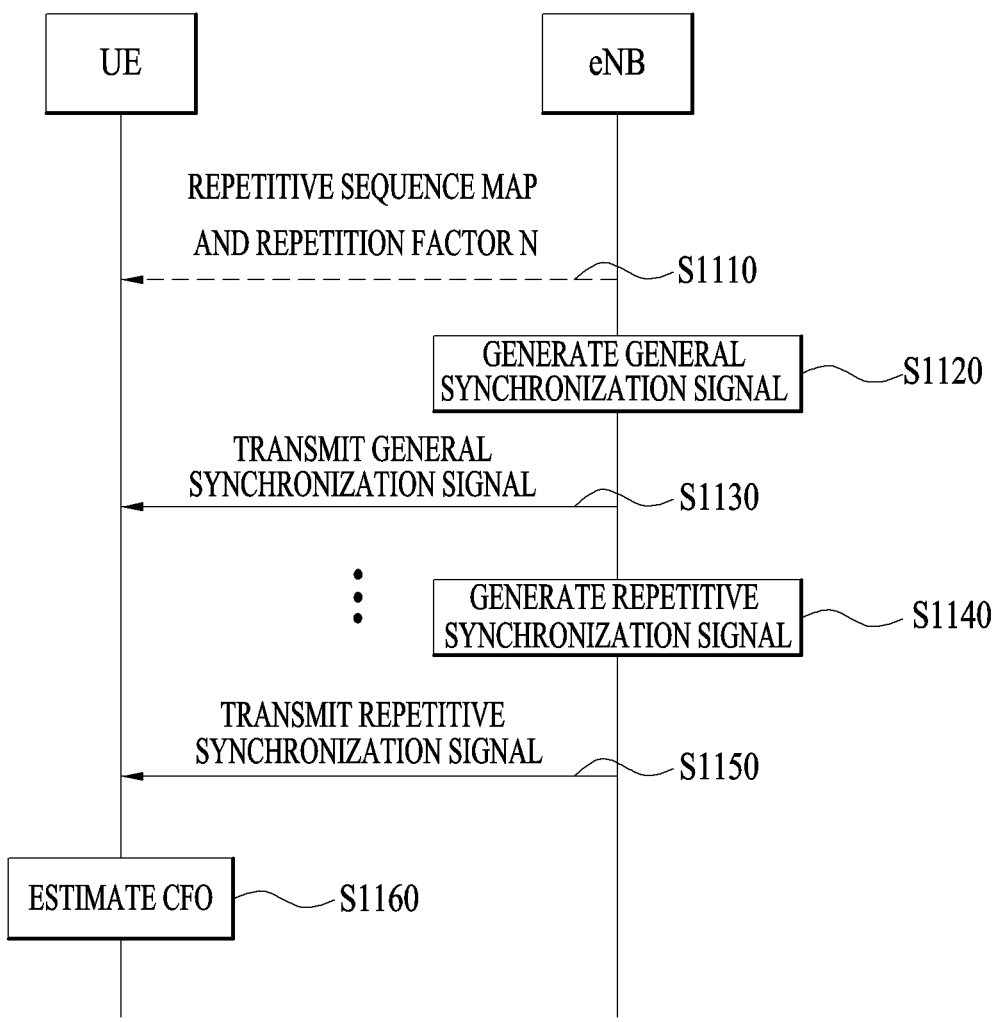
FIG. 11 illustrates another of the methods for transmitting a synchronization signal having a repetitive characteristic according to an embodiment of the present invention.

FIG. 11 illustrates another of the methods for transmitting a synchronization signal having a repetitive characteristic according to an embodiment of the present invention.

Referring to FIG. 11, an eNB may transmit a message including information about a specific frame carrying a repetitive synchronization signal and/or information about a repetition factor used for the repetitive synchronization signal to a UE so that the UE is able to receive the repetitive synchronization signal in the specific frame (S1110).

Step S1110 is optional and thus may or may not be performed according to an embodiment of the present invention. For example, step S1110 is not used during an initial cell search procedure. In this case, the eNB may generate a repetitive synchronization signal on a frequency band basis and/or a frame basis and transmit the repetitive synchronization signal to UEs within a cell. However, if synchronization to a neighbor eNB needs to be acquired, for example, for cell research or handover, the eNB may adaptively perform step S1110 to adjust the repetition factor N.

[Table 5] illustrates an exemplary structure of a repetitive sequence bitmap used in step S1110.

TABLE 5

| Index | Bitmap |
|---|---|
| 512 | 0100000000 |

The bitmap of [Table 5] indicates that a repetitive synchronization signal having a repetitive characteristic is transmitted in radio frame 512 from among a total of 1024 radio frames. [Table 5] is an exemplary bitmap used to indicate the position of a specific radio frame. If the position of the specific frame is changed, the representation of the bitmap is also changed to indicate the changed frame.

[Table 6] illustrates another structure of a repetitive sequence bitmap used in step S1110.

TABLE 6

| Index | Bitmap |
|---|---|
| #3, #7 | 001000100 |

The bitmap illustrated in [Table 6] is used to indicate a frame carrying a repetitive synchronization signal from among a group of radio frames. For example, given 10 frames, the bitmap has a size of 10 bits and may indicate that the third and seventh frames carry a repetitive synchronization signal by setting the third and seventh bits to '1'.

Step S1110 may be performed by higher-layer signaling (e.g., RRC signaling, MAC signaling, etc.) or by physical-layer signaling (e.g., a PDCCH signal).

Referring to FIG. 11 again, the eNB may generate a general synchronization signal or a repetitive synchronization signal based on the repetitive sequence bitmap transmitted by the eNB in step S1110 and transmit the general or repetitive synchronization signal to the UE. For example, if the repetitive sequence bitmap is configured as illustrated in [Table 5], the eNB generates a general synchronization signal and transmits it in frames 0 to 511 to the UE (S1120 and S1130).

Then the eNB generates a repetitive synchronization signal and transmits the repetitive synchronization signal to the UE in frame 512 (S1140 and S1150).

Step S1120 may be performed using the method for generating a synchronization signal described in Clause 3.2 and step S1140 may be performed using the methods for generating a repetitive synchronization signal described in Clauses 3.3 and 3.4 and the repetition factor N acquired in step S1110.

Referring to FIG. 11, the UE may estimate a decimal-multiple CFO using the received general synchronization signal and may estimate and/or correct an integer-multiple CFO using the repetitive synchronization signal (S1160).

While step S1160 is shown in FIG. 11 as performed after step S1150, step S1160 may be performed after step S1130 or each time a synchronization signal is received. Also, the sequence of steps S1120 to S1150 may be changed according to the position of a frame carrying the repetitive synchronization signal.

The repetitive sequence bitmap information transmitted in step S1110 may also indicate the position of a repetitive synchronization signal transmitted by a neighbor eNB as well as the position of a repetitive synchronization signal transmitted by a serving cell. In this case, the UE may acquire/maintain frequency synchronization to the neighbor eNB and perform fast handover to the neighbor eNB using acquired synchronization information.

In another aspect of the present invention, if a repetitive synchronization signal is transmitted in a specific radio frame at a fixed position, the fixed position is set by the system and thus step S1110 need not be performed. In this case, the eNB may generate and transmit a repetitive synchronization signal only in the specific frame, while generating and transmitting a general synchronization signal in the other frames.

Figure 12:
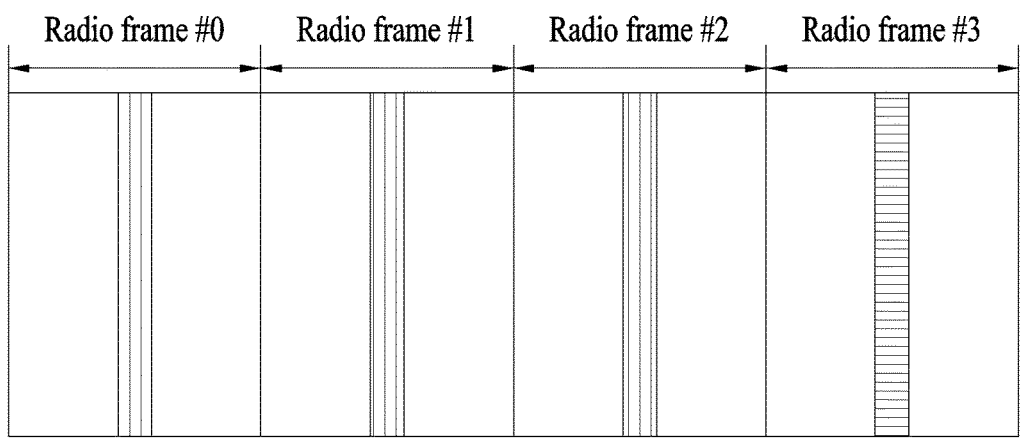
FIG. 12 illustrates another of the methods for transmitting a synchronization signal having a repetitive characteristic according to an embodiment of the present invention.

FIG. 12 illustrates another of the methods for transmitting a synchronization signal having a repetitive characteristic according to an embodiment of the present invention.

Referring to FIG. 12, a repetitive synchronization signal is transmitted in a fourth radio frame, whereas a general synchronization signal is transmitted in first, second, and third radio frames. The radio frame structure with the fourth radio frame fixed in position, illustrated in FIG. 12 may be signaled. Or the position of the repetitive synchronization signal may be dynamically indicated as illustrated in FIG. 11. In this case, the repetitive sequence bitmap transmitted in step S1110 may be set to '0100' in [Table 5] or '0001' in [Table 6]. The repetition factor N is set to 3 herein.

4. Apparatuses

Figure 13:
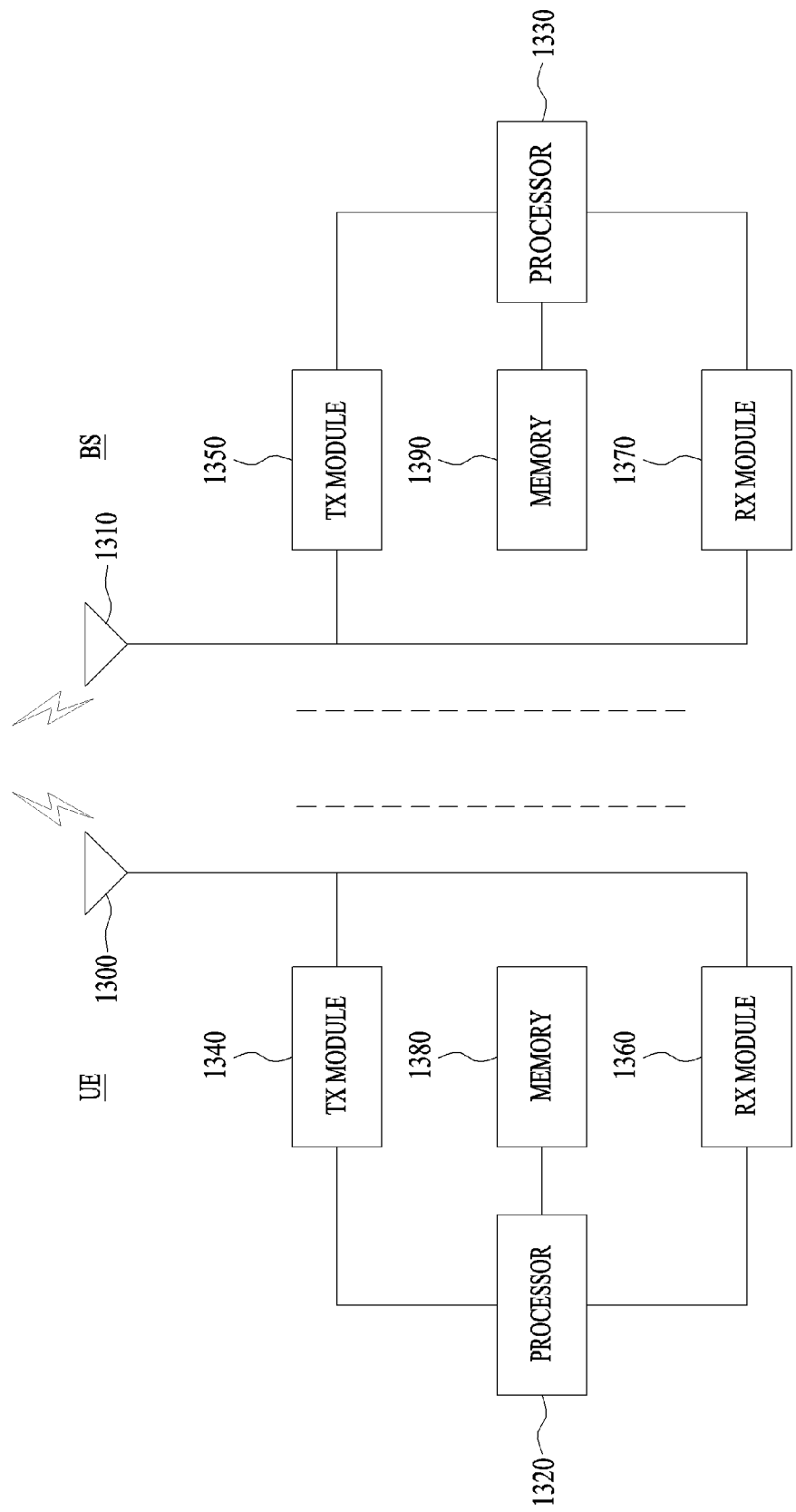
FIG. 13 is a block diagram of apparatuses for implementing the methods described in FIGS. 1 to 12.

Apparatuses illustrated in FIG. 13 are means that can implement the methods described before with reference to FIGS. 1 to 12.

A UE may act as a transmitter on a UL and as a receiver on a DL. A BS may act as a receiver on a UL and as a transmitter on a DL.

That is, each of the UE and the BS may include a Transmission (Tx) module 1340 or 1350 and a Reception (Rx) module 1360 or 1370, for controlling transmission and reception of information, data, and/or messages, and an antenna 1300 or 1310 for transmitting and receiving information, data, and/or messages.

Each of the UE and the BS may further include a processor 1320 or 1330 for implementing the afore-described embodiments of the present invention and a memory 1380 or 1390 for temporarily or permanently storing operations of the processor 1320 or 1330.

The embodiments of the present invention can be implemented using the afore-described components and functions of the UE and the BS. For example, the processor of the BS may generate and transmit a repetitive synchronization signal having a repetitive characteristic by combining the afore-described methods described in Clauses 1 to 3. Then the UE may receive the repetitive synchronization signal, estimate and correct an integer-multiple CFO using the repetitive synchronization signal, and estimate and correct a decimal-multiple CFO using a general synchronization signal.

The Tx and Rx modules of the UE and the BS may perform a packet modulation/demodulation function for data transmission, a high-speed packet channel coding function, OFDMA packet scheduling, TDD packet scheduling, and/or channelization. Each of the UE and the BS of FIG. 13 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS)

phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present invention may be achieved by various means, for example, hardware, firmware, software, or a combination thereof.

In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present invention may be implemented in the form of a module, a procedure, a function, etc. performing the above-described functions or operations. A software code may be stored in the memory 1380 or 1390 and executed by the processor 1320 or 1330. The memory is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

Embodiments of the present invention are applicable to various wireless access systems including a 3GPP system, a 3GPP2 system, and/or an IEEE 802.xx system. In addition to these wireless access systems, the embodiments of the present invention are applicable to all technical fields in which the wireless access systems find their applications.

The invention claimed is:

1. A method for transmitting a synchronization signal by a Base Station (BS) in a wireless access system supporting a high frequency band, the method comprising:

transmitting a message including a repetitive sequence bitmap indicating a position at which a repetitive synchronization signal is transmitted and a repetition factor;

generating a general synchronization signal without a repetitive characteristic;

generating a repetitive synchronization signal based on the repetition factor used for estimating a Carrier Frequency Offset (CFO) of the high frequency band;

transmitting the general synchronization signal in a first frame; and transmitting the repetitive synchronization signal only in the specific frame indicated by the repetitive sequence bitmap, wherein the repetition factor represents a repetitive characteristic of the repetitive synchronization signal, wherein the repetitive sequence bitmap indicates positions of the first and second frames, and wherein the general synchronization signal is used for estimating a decimal-multiple CFO of the CFO and the repetitive synchronization signal is used for estimating an integer-multiple CFO of the CFO.

2. The method according to claim 1, wherein the repetitive synchronization signal is configured by repeating a sequence as many times as the repetition factor, and wherein the sequence is a same sequence used for generating the general synchronization signal.

3. A method for receiving a synchronization signal by a User Equipment (UE) in a wireless access system supporting a high frequency band, the method comprising:

receiving a message including a repetitive sequence bitmap indicating a position at which a repetitive synchronization signal is transmitted and a repetition factor used for generating the repetitive synchronization signal;

receiving a general synchronization signal without a repetitive characteristic in a first frame;

receiving a repetitive synchronization signal transmitted for estimating a Carrier Frequency Offset (CFO) of the high frequency band, only in the specific frame indicated by the repetitive sequence bitmap; and estimating the CFO of the high frequency band using the general synchronization signal and the repetitive synchronization signal, wherein the repetitive sequence bitmap indicates positions of the first and second frames, wherein the repetition factor represents a repetitive characteristic of the repetitive synchronization signal, and wherein the general synchronization signal is used for estimating a decimal-multiple CFO of the CFO and the repetitive synchronization signal is used for estimating an integer-multiple CFO of the CFO.

4. The method according to claim 3, wherein the repetitive synchronization signal is configured by repeating a sequence as many times as the repetition factor, and wherein the sequence is a same sequence used for generating the general synchronization signal.

5. A Base Station (BS) for transmitting a synchronization signal in a wireless access system supporting a high frequency band, the BS comprising:

a transmitter; and a processor configured to generate the synchronization signal, wherein the processor is configured to:

transmit, by using the transmitter, a message including a repetitive sequence bitmap indicating a position at which a repetitive synchronization signal is transmitted and a repetition factor, generate a general synchronization signal without a repetitive characteristic, generate a repetitive synchronization signal based on the repetition factor used for estimating a Carrier Frequency Offset (CFO) of the high frequency band, transmit, by using the transmitter, the general synchronization signal in a first frame through the transmitter, and transmit, by using the transmitter, the repetitive synchronization signal only in the specific frame indicated by the repetitive sequence bitmap, wherein the repetition factor represents a repetitive characteristic of the repetitive synchronization signal, wherein the repetitive sequence bitmap indicates positions of the first and second frames, and wherein the general synchronization signal is used for estimating a decimal-multiple CFO of the CFO and the repetitive synchronization signal is used for estimating an integer-multiple CFO of the CFO.

6. The BS according to claim 5, wherein the repetitive synchronization signal is configured by repeating a sequence as many times as the repetition factor, and where the sequence is a same sequence used for generating the general synchronization signal.

7. A User Equipment (UE) for receiving a synchronization signal in a wireless access system supporting a high frequency band, the UE comprising:

a receiver; and a processor configured to estimate a Carrier Frequency Offset (CFO) of the high frequency band, wherein the processor is configured to:

receive, by using the receiver, a message including a repetitive sequence bitmap indicating a position at which a repetitive synchronization signal is transmitted and a repetition factor used for generating the repetitive synchronization signal, receive, by using the receiver, a general synchronization signal which is generated without a repetitive characteristic in a first frame, receive, by using the receiver, a repetitive synchronization signal transmitted for estimating the CFO of the high frequency band only in a second frame, and estimate the CFO of the high frequency band using the general synchronization signal and the repetitive synchronization signal, wherein the repetitive sequence bitmap indicates positions of the first and second frames, wherein the repetition factor represents a repetitive characteristic of the repetitive synchronization signal, and wherein the general synchronization signal is used for estimating a decimal-multiple CFO of the CFO and the repetitive synchronization signal is used for estimating an integer-multiple CFO of the CFO.

8. The UE according to claim 7, wherein the repetitive synchronization signal is configured by repeating a sequence as many times as a repetition factor, and wherein the sequence is a same sequence used for generating the general synchronization signal.

* * * * *